United States Patent Office 3,147,283
Patented Sept. 1, 1964

3,147,283
NEW DYESTUFFS OF THE NAPHTHO-
FURANDIONE SERIES
Christoph Frey, Basel, Switzerland, assignor to Ciba Limited, Basel, Switzerland, a company of Switzerland
No Drawing. Filed Aug. 7, 1962, Ser. No. 215,262
Claims priority, application, Switzerland,
Aug. 10, 1961, 9,408/61
9 Claims. (Cl. 260—346.2)

The present invention provides new dyestuffs of the naphthofurandione series of the formula (1)
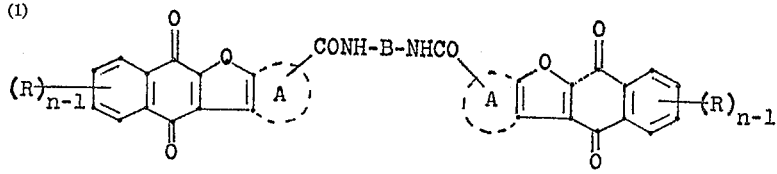

in which A represents an aryl radical, especially a naphthalene radical, B represents an arylene or alkylene radical, R represents a substituent, especially a halogen atom, and $n$ represents a whole number from 1 to 5.

The invention also provides a process for the manufacture of the new dyestuffs, wherein two molecular proportions of a halide of a naphthofurandione carboxylic acid of the formula (2)
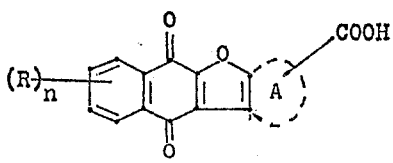

in which A, R and $n$ have the meanings given above, are condensed with one molecular proportion of an aromatic or aliphatic diamine.

Both the carboxylic acid halide and the diamine are advantageously free from groups imparting solubility in water, especially sulfonic acid groups, carboxylic acid groups and sulfonamide groups. Of special interest are those compounds of the Formula 2 in which A represents a naphthalene radical, and more especially those of the formula (3)
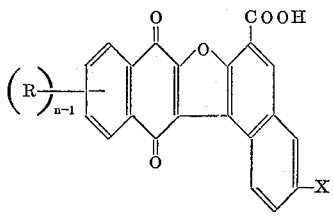

in which R and $n$ have the meanings given above, and X represents a hydrogen atom or a halogen atom.

These compounds are obtainable by condensing a 2:3-dihalogen-naphthoquinone or a substitution product thereof, such as 2:3-dibromonaphthoquinone, 2:3:6-trichloronaphthaquinone, 2:3:6 - tribromonaphthoquinone, 2:3-dichloro-6-nitronaphthoquinone, 2:3 - dibromo-6-nitronaphthoquinone or 2:3-dichloro-6-acetylaminoquinone, with 2:3-hydroxynaphthoic acid ethyl ester in boiling pyridine. An ester of 1:4- or 2:6-hydroxynaphthalene carboxylic acid may be used instead of an ester of 2:3-hydroxynaphthoic acid. There may also be used as starting materials the carboxylic acids of the Formula 2, in which A represents a more highly condensed aryl radical, for example, an anthracene radical. For conversion into their halides, the naphthofurandione carboxylic acids are treated with acid-halogenating agents, especially agents that form acid chlorides, for example, phosphorus halides, such as phosphorus pentabromide or phosphorus trichloride or phosphorus pentachloride, phosphorus oxy-halides or advantageously thionyl chloride.

The treatment with such acid halogenating agents is advantageously carried out in an inert organic solvent, such as dimethyl-formamide, chlorobenzenes, for example, monochlorobenzene or dichlorobenzene, toluene, xylene or nitrobenzene. Dimethyl-formamide may be added in the case of the last five solvents.

In the process of the invention the monocarboxylic acid halides so obtained are condensed with aromatic or aliphatic diamines in the molar ratio of 2:1. As diamines there are advantageously used those of the formula

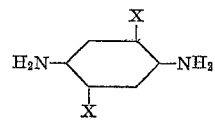

or $$H_2N-\phantom{X}-\phantom{X}-NH_2$$

in which each X represents a hydrogen atom or a lower alkyl or alkoxy group.

As bicyclic diamines there may be mentioned diaminodiphenyls, diaminodiphenylalkanes, diaminodiphenyl oxides, diaminodiphenyl sulfides and diaminodiphenylamines.

As examples there may be mentioned the following amines:

1:4-diaminobenzene,
1:3-diaminobenzene,
1:3-diamino-4-methylbenzene,
1:3-diamino-4-methoxybenzene,
1:3-diamino-4:6-dichlorobenzene,
1:3-diamino-4-chlorobenzene,
1:3-diamino-2:5-dichlorobenzene,
1:4-diamino-2-chlorobenzene,
1:4-diamino-2-bromobenzene,
1:4-diamino-2:5-dichlorobenzene,
1:4-diamino-2-methylbenzene,
1:4-diamino-2:5-dimethylbenzene,
1:4-diamino-2-methoxybenzene,
1:4-diamino-2:5-dimethoxybenzene,
1:4-diamino-2:5-diethoxybenzene,
1:3-diamino-4:6-dimethylbenzene,
1:3-diamino-2:6-dimethylbenzene,
4:4'-diaminodiphenyl,
3:3'-dichloro-4:4'-diaminodiphenyl,
3:3'-dimethyl-4:4'-diaminodiphenyl,
3:3'-dimethoxy-4:4'-diaminodiphenyl,
3:3':5:5'-tetrachloro-4:4'-diaminodiphenyl,
3:3'-dichloro-5:5'-dimethyl-4:4'-diaminodiphenyl,
4:4'-diaminodiphenylmethane,
4:4'-dimethoxy-3:3'-diaminodiphenylmethane,
4:4'-diaminodiphenylamine,
4:4'-diamino-azobenzene,
4:4'-diaminodiphenyl-oxide,
4:4'-diaminodiphenylene-oxide, 4:4'-diaminodiphenyl-sulfone,
4:4'-diaminodiphenyl-ketone,
3:3'-diamino-4:4'-dichlorobenzil,
2:6- or 1:5-diaminonaphthalene, and
Diaminobenzthiazole, such as 2-(4'-aminophenyl)-6-amino-benzthiazole. Arylene diamines that consist of at least 3 fused rings may also be used, for example, diaminoanthraquinones, such as 2:6-, 2:7-, 1:5- or 1:8-diamino-anthraquinone, 2:8-diaminochrysene, 3:8- and 3:10-diaminopyrene and 4:11-diaminofluoranthene. As further diamines there may be mentioned hydrazine and alkylene diamines, for example ethylene diamine.

The condensation of the above defined carboxylic acid halides with the amines is advantageous carried out in an anhydrous medium. Under these conditions the condensation generally takes place surprisingly rapidly, even at temperatures within the boiling range of normal organic solvents, such as toluene, monochlorobenzene, dichlorobenzene, trichlorobenzene, nitrobenzene, and the like. In order to accelerate the reaction it is generally of advantage to use an agent capable of binding acid, such as anhydrous sodium acetate or pyridine. Some of the dyestuffs so obtained are crystalline and others are amorphous, and they are generally obtained in a very good yield and in a pure state. It is of advantage first to isolate the acid chlorides obtained from the carboxylic acids. In some cases, however, the isolation of the acid chlorides may be dispensed with without harm, and the condensation may be carried out immediately following the formation of the carboxylic acid chlorides.

The dyestuffs of the invention are useful for dyeing a very wide variety of materials, for example, they can be used as vat dyestuffs for dyeing cellulosic fibers or animal fibers, such as wool or silk, or synthetic fibers, such as polyamides or polyesters. The dyestuffs of the invention can also be sulfonated and used in this state for dyeing the aforesaid fibers. Furthermore, they are also suitable for use as pigments in all the usual applications, for example, in pigment printing, that is to say, in printing processes in which pigments are fixed on a substratum, particularly a textile fiber or another sheet-like substratum, such as paper (for example, wall-paper) or fabrics of glass fibers, by means of a suitable adhesive, such as casein, a thermosetting resin, particularly a urea- or melamine-formaldehyde condensation product, or a solution or emulsion of polyvinyl chloride or polyvinyl acetate, or other emulsion (for example, oil-in-water or water-in-oil emulsions). The pigments of the invention are also useful for other purposes, for example, in a finely divided form for the spin-dyeing of viscose or cellulose ethers or esters or polyamides, polyurethanes or polyacrylonitrile, and also for the manufacture of colored lacquers or lacquer-formers, solutions or products of acetyl cellulose, nitrocellulose and natural high-molecular substances, such as rubber and casein, and synthetic resins, such as polymerization resins, for example, polyvinyl chloride, polyethylene, polypropylene and polystyrene, and condensation resins, for example, aminoplasts and phenoplasts, and also silicone and silicone resins. They are also useful in the manufacture of cosmetic preparations or laminated sheet material.

By virtue of their chemical inertness and good heat resistance, the pigments can be dispersed in the usual manner in the aforesaid masses and preparations, and this is advantageously carried out at a stage before the said masses and preparations have reached their final form. The pigments can be converted into a finely divided form by the known conditioning methods. The operations required for giving the products their final form, such as spinning, pressing, hardening, casting, cementing and the like can be carried out in the presence of the pigments of the invention.

The pigments of the invention are distinguished by their excellent fastness to light and excellent fastness to migration.

The following examples illustrate the invention, the parts and percentages being by weight unless otherwise stated.

*Example 1*

7.21 parts of dinaphthofuran-8:13-dione-6-carboxylic acid chloride of the formula

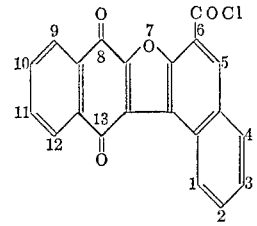

(Numbering according to Patterson Ring Index)

made by the method described in Example 2, are heated to 100 to 110° C. in 170 parts of anhydrous ortho-dichlorobenzene and 0.05 part of thionyl chloride. To the reaction mixture is then added a solution, having a temperature of 100 to 110° C. of 1.08 parts of 1:4-diaminobenzene in 50 parts of anhydrous ortho-dichlorobenzene and 0.1 part of anhydrous pyridine and the whole is heated for 6 hours at 145 to 150° C. The reaction mixture is cooled to 100° C., filtered, and the filter residue is washed with ortho-dichlorobenzene having a temperature of 100 to 120° C. until the washings run colorless, whereupon the ortho-dichlorobenzene is removed with methanol and water, and the pigment so obtained is dried in vacuo at 90 to 100° C. There is obtained an orange-red powder that yields an orange foil exhibiting excellent fastness to migration and good fastness to light when it is worked into polyvinyl chloride.

In the following table there are listed other pigment dyestuffs that can be obtained by condensing the acid chloride described in Example 1 with the diamines listed in column I. Column II indicates the tints of polyvinyl chloride foils colored with the said pigments.

| I | II |
| --- | --- |
| 2:5-dimethoxy-1:4-diaminobenzene | Brown. |
| 2-methoxy-5-chloro-1:4-diaminobenzene | Yellowish red. |
| 2-methyl-5-chloro-1:4-diaminobenzene | Yellow. |
| 2:5-dimethyl-1:4-diaminobenzene | Do. |
| 2-chloro-1:4-diaminobenzene | Red. |
| 4:4'-diaminodiphenyl | Reddish yellow. |
| 3:3'-dimethoxy-4:4'-diaminodiphenyl | Brown. |
| 3:3'-dimethyl-4:4'-diaminodiphenyl | Yellow. |
| 1:5-diaminonaphthalene | Brownish orange. |
| 4:11-diaminofluoranthene | Yellow. |
| 3:8-diaminopyrene | Brown. |
| 3:10-diaminopyrene | Yellowish brown. |
| 2-methoxy-1:4-diaminobenzene | Brownish yellow. |
| 2:5-dichloro-1:4-diminobenzene | Reddish yellow. |
| 3:3'-dichloro-4:4'-diaminodiphenyl | Yellow. |
| 4:4'-diaminodiphenylether | Do. |
| 4:4'-diamino-diphenylsulfone | Do. |
| 4:4'-diamino-azobenzene | Orange. |
| 3:3'-diamino-4:4'-dichlorobenzil | Yellow. |
| Ethylene diamine | Do. |
| Hydrazine | Do. |

*Example 2*

108 parts of 2:3-hydroxynaphthoic acid ethyl ester are heated for 3 hours under reflux in 500 parts of pyridine together with 115 parts of 2:3-dichloronaphthoquinone. After cooling the reaction mixture, the precipitated dinaphthofurandione-6-carboxylic acid ethyl ester of the formula

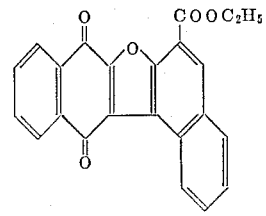

is filtered off and washed with ethanol and hot water. The product is dried in vacuo at 90 to 100° C. The ester can be recrystallized from ortho-dichlorobenzene and melts at 242 to 243° C. (uncorrected).

114 parts of dinaphthofurandione-6-carboxylic acid ethyl ester are boiled for 24 to 30 hours under reflux in 700 parts of glacial acetic acid and 138 parts of sulfuric acid of 98% strength. After cooling the reaction mixture, it is filtered and the filter residue is washed successively with ethanol and water until the washings run neutral. The yellow dinaphthofurancarboxylic acid of the formula

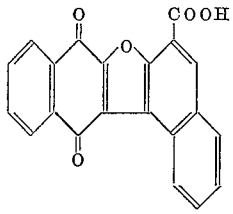

so obtained is dried in vacuo at about 100° C. It melts at 359 to 360° C. when recrystallized from dimethylformamide.

The acid chloride is made by heating 20 parts of the above acid to 100 to 110° C. in 390 parts of anhydrous ortho-dichlorobenzene, then adding 9 parts of thionyl chloride dropwise and heating the whole for 3 hours at 125 to 130° C. The reaction mixture is then heated for ½ hour at 160 to 165° C., allowed to cool, and the precipitated acid chloride is filtered off. It is then washed with anhydrous benzene and dried in vacuo at 70 to 80° C. It melts at 298 to 300° C. (uncorrected).

*Example 3*

8.8 parts of 3-bromodinaphthofurandione-6-carboxylic acid chloride of the formula

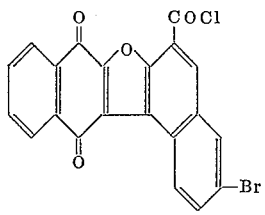

are heated to 110 to 120° C. in 170 parts of anhydrous ortho-dichlorobenzene in the presence of 0.05 part of thionyl chloride. To the reaction mixture are then added 1.68 parts of 2:5-dimethoxy-1:4-diaminobenzene that have been dissolved hot in 50 parts of ortho-dichlorobenzene. 0.1 part of pyridine is then added and the whole is stirred for 6 hours at 145 to 150° C. The reaction mixture is filtered while hot, the filter residue is washed successively with hot ortho-dichlorobenzene, methanol and water, and then dried in vacuo at 90 to 100° C. When the brown pigment powder so obtained is worked into polyvinyl chloride on a roller mill there is obtained a brown foil possessing a good fastness to light and a very good fastness to migration.

If the 2:5-dimethoxy-1:4-diaminobenzene is replaced by an equivalent proportion of a diamine listed in column I of the following table there is obtained a pigment possessing similar properties of fastness. Column II indicates the tints which polyvinyl chloride foil is colored.

| I | II |
|---|---|
| 1:4-diaminobenzene | Yellow-brown. |
| 3:3'-dichloro-4:4'-diaminodiphenyl | Yellow. |
| 3:3'-dimethoxy-4:4'-diaminodiphenyl | Brownish yellow. |
| 2:5-dichloro-1:4-diaminobenzene | Yellow. |
| 2-methoxy-5-chloro-1:4-diaminobenzene | Brownish yellow. |

The bromo-dinaphthofurandione-carboxylic acid chloride can be obtained by the following method:

140.5 parts of 6-bromo-2:3-hydroxynaphthol acid methyl ester are heated for 3 hours under reflux and while stirring in 500 parts of pyridine and 115 parts of 2:3-dichloronaphthoquinone. After cooling the reaction mixture, it is filtered and the 3-bromo-dinaphthofurandione-6-carboxylic acid methyl ester so obtained and having the formula

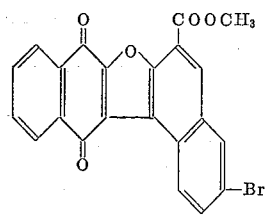

is washed with ethanol and then with hot water until the washings run completely colorless. The product is dried in vacuo at 90 to 100° C. The ester so obtained melts at 329 to 330.5° C. (uncorrected).

22 parts of the above methyl ester are heated under reflux in 200 parts of alcohol. 23.5 parts of 5 N-sodium hydroxide solution are then added dropwise and the whole is maintained at the boil for a further 20 minutes. The reaction mixture is then rendered acid to Congo with 35 parts of hydrochloric acid of 15% strength, stirred for some time and then filtered.

The residue is washed free from acid with hot water, and the free 3-bromo-dinaphthofurandione-6-carboxylic acid of the formula

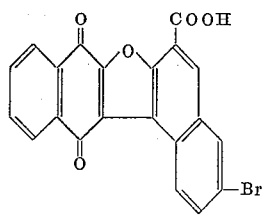

is dried in vacuo at 80 to 100° C.

16 parts of the acid so obtained are heated to 100 to 110° C. in 260 parts of anhydrous ortho-dichloro-benzene, then 8.2 parts of thionyl chloride are added dropwise and the whole is heated to 130 to 140° C. while stirring. After 2 hours, the temperature is raised to 160 to 165° C. and the reaction mixture is maintained at that temperature for ½ to 1 hour. After cooling the reaction mixture it is filtered, the filter residue is washed with anhydrous benzene, and the acid chloride so obtained is dried in vacuo at 70 to 80° C. It melts 330° C.

*Example 4*

7.21 parts of dinaphthofurandione-3-carboxylic acid chloride of the formula

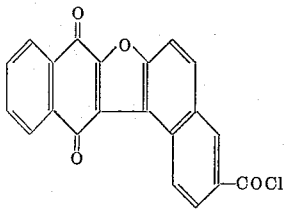

are heated to 110 to 120° C. in 170 parts of anhydrous ortho-dichlorobenzene and 0.05 part of thionyl chloride. To the reaction mixture is then added a hot solution of 1.77 parts of 2:5-dichloro-1:4-diaminobenzene in 50 parts of anhydrous ortho-dichlorobenzene and 0.5 part of pyridine and the whole is heated for 6 hours at 145 to 150° C. while stirring. The reaction mixture is filtered at 120° C. and the filter residue is washed with hot ortho-dichlorobenzene until the washings run colorless. After washing with methanol and water the yellow pigment so obtained is dried in vacuo at 90 to 100° C. When it is worked into polyvinyl chloride on a roller mill there is obtained a yellow foil possessing a good fastness to light and a very good fastness to migration.

If the 2:5-dichloro-1:4-diaminobenzene is replaced by an equivalent proportion of 2:5-dimethoxy-1:4-diaminobenzene there is obtained a brown pigment powder that yields yellow-brown polyvinyl chloride foils likewise possessing good properties of fastness.

The dinaphthofurandione-carboxylic acid chloride can be made as follows:

101 parts of 2:6-hydroxynaphthoic acid methyl ester and 115 parts of 2:3-dichloronaphthoquinone are heated for 3 hours under reflux and while stirring in 550 parts of pyridine. After cooling the reaction mixture it is filtered and the dinaphthofurandione-3-carboxylic acid methyl ester of the formula

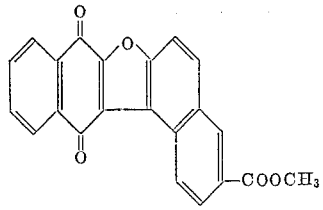

so obtained is washed with ethanol and hot water. It is then dried in vacuo at 90 to 100° C. The ester can be recrystallized from ortho-dichlorobenzene after which process it melts at 284.5 to 285° C. (uncorrected).

The hydrolysis can be carried out as described above with sodium hydroxide in ethanol, likewise the manufacture of the acid chloride in ortho-dichlorobenzene with thionyl chloride.

*Example 5*

7.9 parts of 10- or 11-chlorodinaphthofurandione-6-carboxylic acid chloride of the formula

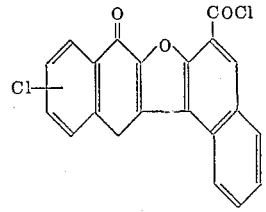

are heated to 110 to 120° C., while stirring, in 170 parts of anhydrous ortho-dichlorobenzene after the addition of 0.05 part of thionyl chloride. To the reaction mixture is then added a warm solution of 1.08 parts of 1:4-diaminobenzene in 50 parts of anhydrous ortho-dichlorobenzene and 0.1 part of pyridine, and the whole is heated for 6 hours at 145 to 150° C. The orange-red pigment that precipitates thereby is isolated from the warm reaction mixture by filtration and then well washed with hot ortho-dichlorobenzene, methanol and water. After drying in vacuo at 90 to 100° C. there is obtained an orange powder that yields an orange foil of very good fastness to migration and good fastness to light when it is worked into polyvinyl chloride on a roller mill.

If the 1:4-diaminobenzene is replaced by an equivalent amount of a diamine listed in column I of the following table there are obtained pigments with similar properties of fastness. Column II indicates the tints of the polyvinyl chloride foils colored therewith.

| I | II |
| --- | --- |
| 2:5-dichloro-1:4-diaminobenzene | Bluish red. |
| 2:5-dimethoxy-1:4-diaminobenzene | Brown. |
| 2:5-dimethyl-1:4-diaminobenzene | Yellow. |
| 2-methyl-5-chloro-1:4-diaminobenzene | Red brown. |
| 3:3'-dimethoxy-4:4'-diamino-diphenyl | Do. |

The 10- or 11-chlorodinaphthofurandione-carboxylic acid chloride can be made in the following manner:

66 parts of 2:3:6-trichloronaphthoquinone-(1:4) and 54 parts of 2:3-hydroxynaphthoic acid ethyl ester are kept at the boil for 2 hours in 350 parts of pyridine while stirring. After cooling the reaction mixture the 10- or 11-chlorodinaphthoquinonedione-6-carboxylic acid ethyl ester of the formula

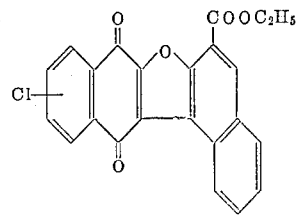

is isolated by filtration and then washed with alcohol and hot water. It is dried in vacuo at 90 to 100° C. It can be recrystallized from dimethylformamide after which process it melts at 220 to 240° C.

There is probably obtained a mixture of 10- and 11-chlorodinaphthofuran-8:13-dione-6-carboxylic acid ethyl ester of the formulae

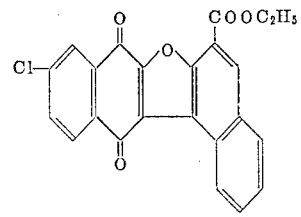

and

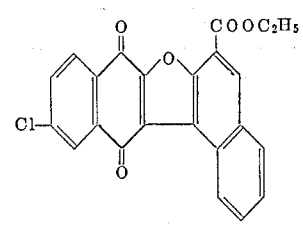

The hydrolysis can be effected in glacial acetic acid and sulfuric acid as in the case of the unsubstituted ester in Example 2. The free acid melts at above 330° C.

58 parts of the said 10- or 11-chlorodinaphthofurandione-6-carboxylic acid are heated to 100 to 110° C. in 900 parts of ortho-dichlorobenzene and 23 parts of thionyl chloride are added dropwise. The whole is heated to 120° C. and maintained at that temperature for 2 to 3 hours, in which process all components dissolve. After cooling the reaction mixture to room temperature, the precipitated acid chloride is isolated by filtration, washed with dry benzene, and then dried in vacuo at 70 to 80° C. The acid chloride is obtained in the form of orange-red needles.

*Example 6*

A suspension of 34.2 parts of dinaphthofurandione-6-carboxylic acid of the formula

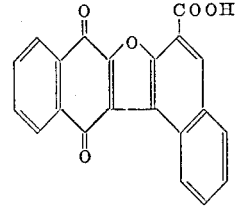

in 750 parts of anhydrous ortho-dichlorobenzene and 14.75 parts of thionyl chloride is heated to 130° C. in the course of 40 minutes and kept at 130 to 135° C. for 2 hours. To the acid chloride solution so obtained is added in the course of 5 minutes a solution of 5.7 parts of 1:4-diamino-benzene in 150 parts of anhydrous ortho-dichlorobenzene and 2.5 parts of anhydrous pyridine, the said solution having a temperature of 120° C. The whole is heated to 140° C. and kept at that temperature for 10 hours. The reaction mixture is allowed to cool to 110° C., whereupon the precipitated pigment is isolated by filtration and then washed with ortho-dichlorobenzene having a temperature of 100 to 120° C. until the washings run practically colorless. It is then washed successively with methanol and water. The pigment is then dried in vacuo at 90 to 100° C. The properties of the pigment prepared in this manner correspond to those of the pigment described in Example 1.

*Example 7*

65 parts of stabilized polyvinyl chloride, 35 parts of dioctyl phthalate and 0.2 part of pigment obtained as described in Example 1 are mixed together and then rolled to and fro on a two-roller calender for 7 minutes at 145° C. There is obtained an orange foil possessing good fastness to light and good fastness to migration. If 5 parts of titanium dioxide are used in addition to the prescribed amount of pigment there is obtained an orange pastel tint.

*Example 8*

0.25 part of the dyestuff obtained as described in Example 1 is ground for 24 hours in a rod mill with 40 parts of an alkyd-melamine stoving enamel that contains 50% of solid substance, and 4.75 parts of titanium dioxide. A thin coating of the enamel so obtained is applied to an aluminum foil and stoved for 1 hour at 120° C. There is obtained an orange-colored enamel coating possessing a good fastness to light.

*Example 9*

The following single layers are prepared for the manufacture of a laminate:

(*a*) Strong paper made from unbleached sulfate cellulose (kraft paper) is saturated with an aqueous solution of a phenol-formaldehyde resin, pressed, and then dried.

(*b*) Paper made from pure, chemically bleached cellulose and containing zinc sulfide or titanium dioxide as filler is saturated with a 50% aqueous solution of dimethylolmelamine, pressed, and then dried at 100° C.

(*c*) 400 parts of a fancy paper made from bleached cellulose and containing zinc sulfide or titanium dioxide as colarant are pulped in a beater with 10,000 parts of water. To the paper pulp so prepared are added 30 parts of the pigment obtained as described in Example 1. The pigment is fixed by the addition of 16 parts of aluminum sulfate. The colored fancy paper is saturated with a 30% aqueous solution of dimethylolmelamine, pressed, and then dried at 100° C.

(*d*) Depending on the quality of the laminate to be made, the fancy paper is protected by tissue paper made from bleached special cellulose and that weighs 40 g. per square meter. The tissue paper is likewise saturated with a 50% aqueous solution of dimethylolmelamine, pressed, and then dried at 100° C.

Pieces of the material so prepared, all being of equal size, for example, 2.75 meters by 1.25 meters, are placed one on top of the other as follows: 3 to 5 layers of paper (*a*), 1 layer of paper (*b*), 1 layer of paper (*c*) and, if necessary, 1 layer of paper (*d*). The whole is then pressed for 12 minutes at 140 to 150° C. between mirror-finished chromium-plates at a pressure of 100 kg. per square centimeter. After being allowed to cool to 30° C., the laminate so formed is removed from the press. One side of it displays an orange coloration that possesses a good fastness to light.

What is claimed is:

1. A dyestuff of the naphthofurandione series of the formula

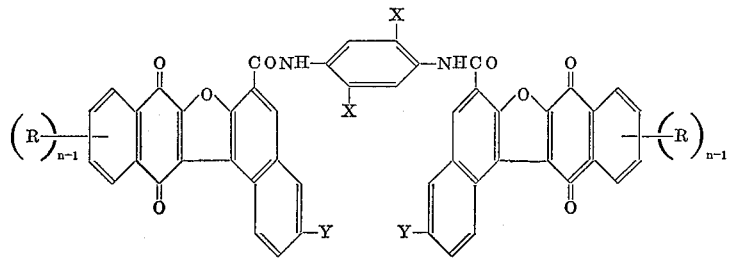

in which R represents chlorine, X a member selected from the group consisting of hydrogen atoms, chlorine, lower alkyl and lower alkoxy groups, Y a member selected from the group consisting of hydrogen and bromine and *n* is a whole number from 1 to 2.

2. A dyestuff of the naphthofurandione series of the formula

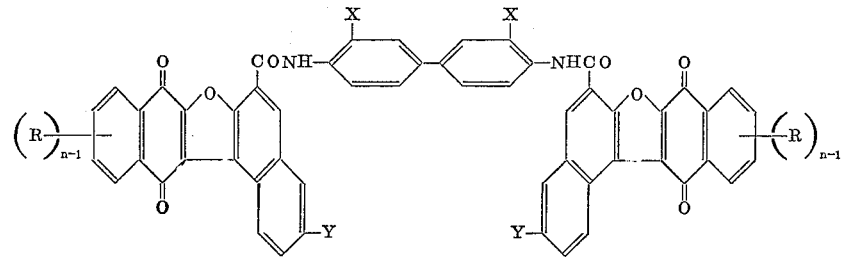

in which R represents chlorine, X a member selected from the group consisting of hydrogen atoms, chlorine, lower alkyl and lower alkoxy groups, Y a member selected from the group consisting of hydrogen and bromine and *n* is a whole number from 1 to 2.

3. The dyestuff of the formula

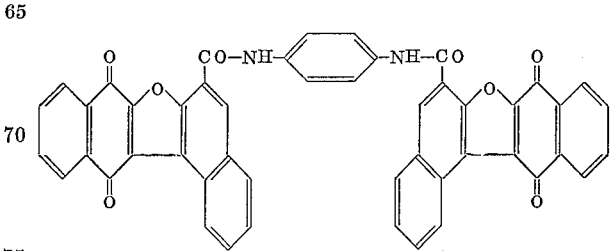

4. The dyestuff of the formula
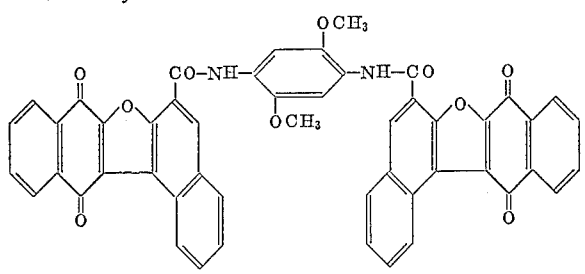
5. The dyestuff of the formula
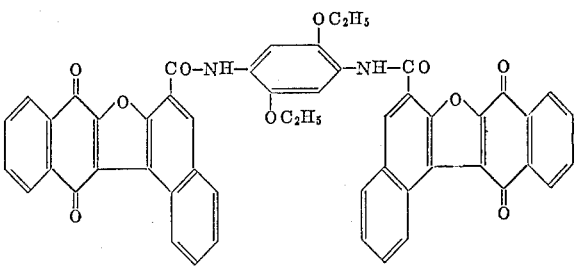
6. The dyestuff of the formula
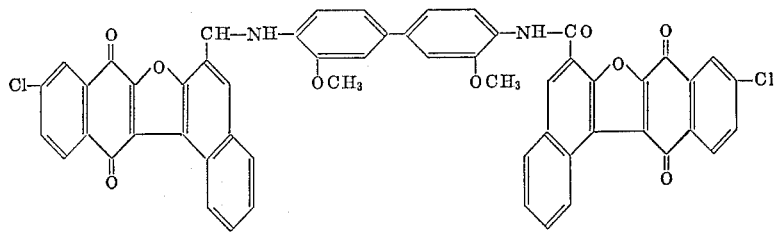
7. The dyestuff of the formula
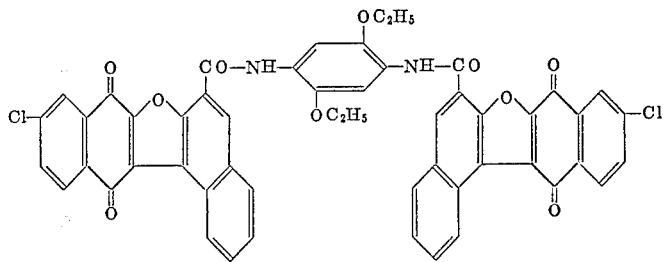
8. The dyestuff of the formula
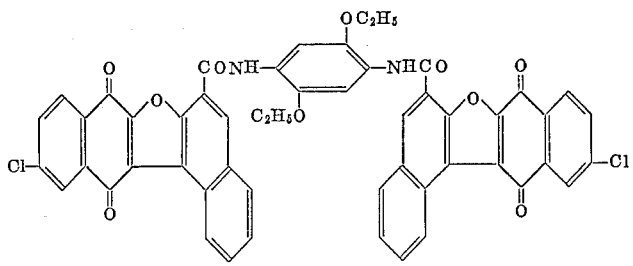
9. The dyestuff of the formula
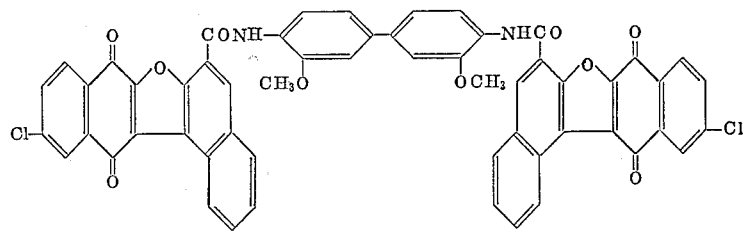
No references cited.